Jan. 19, 1954  R. S. WHITCHER ET AL  2,666,665
DEVICE FOR HANDLING EGGS

Filed Sept. 8, 1949  2 Sheets-Sheet 1

INVENTORS:
ROY S. WHITCHER & GEORGE O. WYATT
BY
ATTORNEY

Jan. 19, 1954  R. S. WHITCHER ET AL  2,666,665
DEVICE FOR HANDLING EGGS

Filed Sept. 8, 1949  2 Sheets-Sheet 2

INVENTORS:
ROY S. WHITCHER
AND GEORGE O. WYATT
BY
Robert E. Burns
ATTORNEY

Patented Jan. 19, 1954

2,666,665

UNITED STATES PATENT OFFICE 2,666,665

DEVICE FOR HANDLING EGGS

Roy S. Whitcher, Mount Clear, via Ballarat, and George O. Wyatt, Ivanhoe, Victoria, Australia Application September 8, 1949, Serial No. 114,622

4 Claims. (Cl. 294—87)

This invention relates to a device for handling eggs, and is designed to enable a multiplicity of eggs to be handled or treated at the one time, as for instance in the operation of oiling for export, and other operations.

Eggs received at a bulk store are normally packed in boxes containing a number of tiers of what are called "egg fillers," which are trays divided into compartments, in each of which an egg is supported.

The egg fillers are of varying sizes and construction, but a well known standard egg filler comprises thirty compartments, or, that is to say, supports thirty eggs in equally spaced apart relationship, and, in order that the eggs may be oiled, or otherwise treated, they must be removed from the fillers.

Hitherto, with one known type of filler, it has been necessary to remove each egg separately therefrom, the eggs thereafter, in many cases, being handled in numbers but being replaceable in the fillers only one or two at a time.

With another known type of filler it has been necessary to remove a portion of the filler before the eggs could be lifted.

Thus, in the preparation of eggs for transport, much time has been lost in handling the eggs, and the principal object therefore of this invention, is to provide a device which enables all the eggs in a filler to be removed therefrom at one operation, without removing any part of the filler, retained in the device whilst being subjected to treatment, and placed thereby in a filler or in another desired position, after the treatment has been completed.

Another object of the invention is to provide a device for the purposes set forth, which will be applicable without change, to eggs of all sizes.

With the above and other objects in view, a device for handling eggs, according to this invention, includes a rim member or perimeter which may be considered as a fixed frame, and which is of the general shape and dimensions of a standard egg box, transverse bars across the perimeter and equal in number to the rows of eggs across one dimension of a filler, egg-gripping members secured to and depending from the said transverse bars and equal in number and disposition to the eggs supported in the filler, means to enable the device to be held conveniently during the operation of handling the eggs, and a floating frame having means associated therewith for releasing the eggs from the gripping members when it is desired to replace them in the filler.

A clear understanding of the invention may be arrived at from a consideration of the accompanying drawings, wherein—

Figure 1:
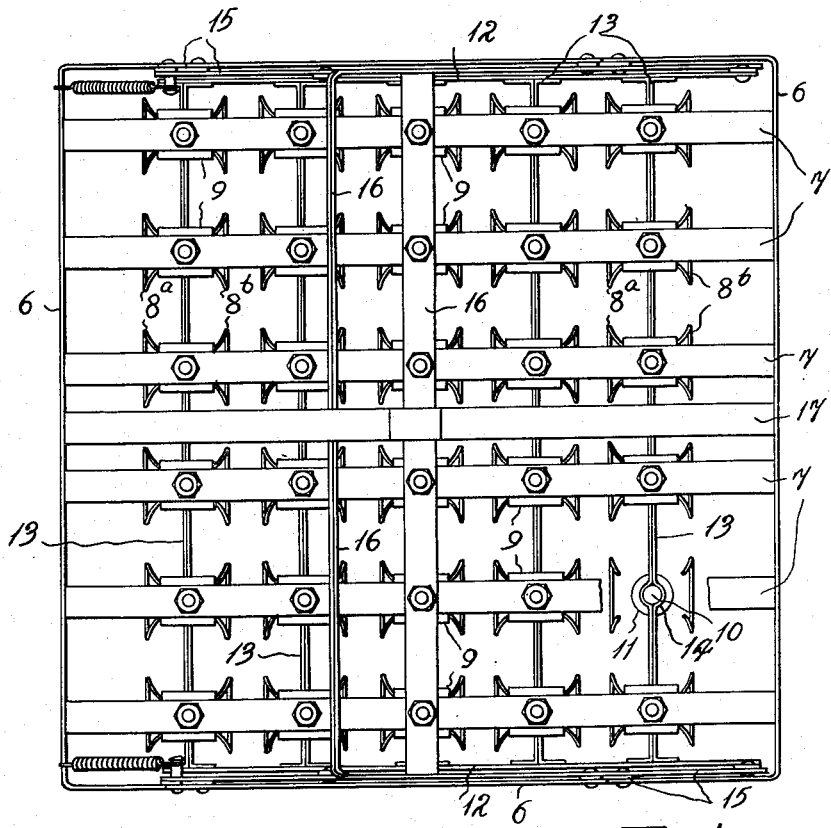
Figure 1 is a plan view of the device.
Figure 2:
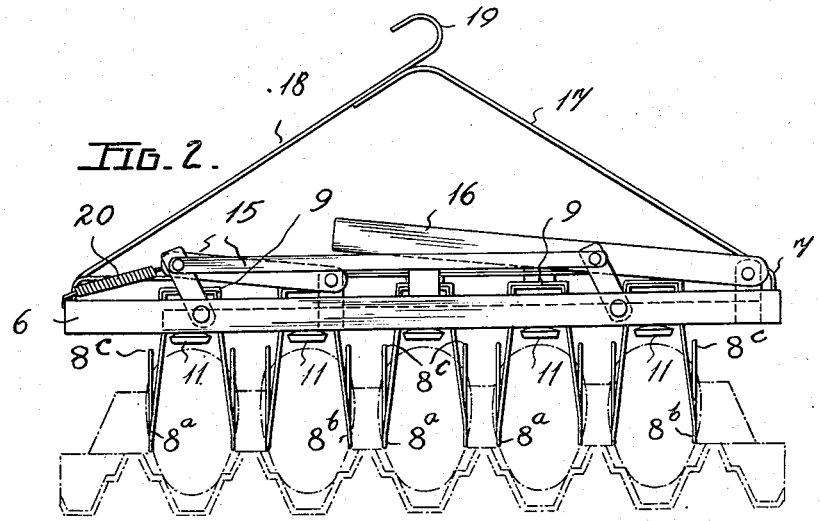
Figure 2 is a side elevation showing in dotted lines a filler and eggs therein being gripped by the device.

In carrying the invention into practical effect, the arrangement comprises, in general, a rim or perimeter and transverse bars thereon, the whole constituting a fixed frame, egg-gripping members depending therefrom, and a floating or movable frame carrying a multiplicity of egg ejectors, equal in number and disposition to the egg-gripping members, the said floating frame being connected to the said fixed frame by systems of levers or parallel linkage, the actuation of which operates or retracts the said ejectors at the desired times.

According to the exemplification illustrated, a rim or perimeter 6 is provided, constructed preferably from a strip of stout metal bent to the rectangular shape and dimensions of a standard egg box, so that the said rim or perimeter may fit accurately but freely therein.

Transversely across the perimeter in one direction there is affixed a number of bars 7, and to suit a known type of filler, there may be six such bars arranged in spaced apart relationship, so that, in accordance with the arrangement of eggs in the filler, there will be one such bar in register with each row of eggs when the device is placed over a filler with the rim or perimeter coincident with the peripheral edge thereof. This relationship of the device to the filler will be effected when the device is placed in the open top of an egg box packed with tiers of eggs in the fillers.

The perimeter 6 and bars 7 constitute a fixed frame, and, on each transverse bar thereof, there are fitted egg-gripping members, and, in the example shown, there will be five such members on each bar, in equally spaced relationship thereon.

This arrangement will provide that an egg-gripping member will be located immediately above each egg in a filler when the device is positioned immediately thereabove.

Each said egg-gripping member comprises a pair of similar structures 8a and 8b, each comprising a length of fairly stiff, springy wire, Each member 8a and 8b has its ends secured under a bracket 9 of which said brackets there is a multiplicity arranged in predetermined spaced apart relationship on the bars 7.

Figure 3:
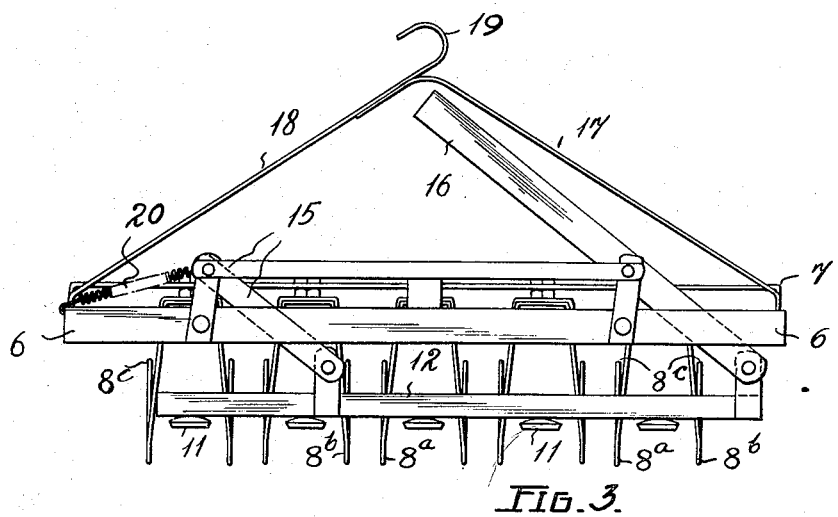
Figure 3 is a side elevation showing the eggs ejecting means brought into operation.
Figure 4:
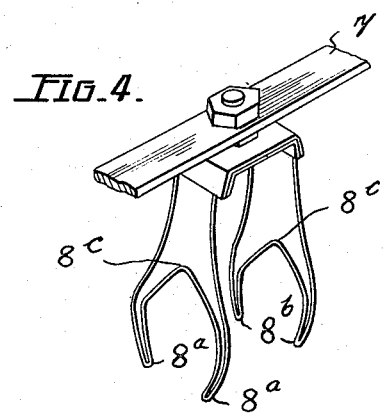
Figure 4 is a perspective view showing an egg-gripping member.

The construction of the egg-gripping members 5 is such that each is, in effect, a loop bent back upon itself, or that is to say, the wire intermediately of the ends is bent divergently for a distance, then convergently for a shorter distance, again bent divergently, finally converging to an apexial portion 8c which lies within the longer divergent arms, but is offset slightly in the vertical plane, as shown in Figure 3.

The arrangement provides a pair of similar wire members each having a pair of flexible limbs capable of flexing independently of one another, and the egg-gripping members thus provided will firmly grip eggs of different sizes without any tendency to break the shells.

There is associated with each pair of gripping members, an ejector which is arranged therebetween and adapted to be forced downwardly at the appropriate times to eject an egg from the gripping members.

The ejectors are of course equal in number and disposition to the egg-gripping members and are all operated simultaneously.

Each ejector comprises a stud 10 to which is secured a pusher 11 which is preferably constructed as a concave disc of rubber or the like suitable material.

Figure 5:
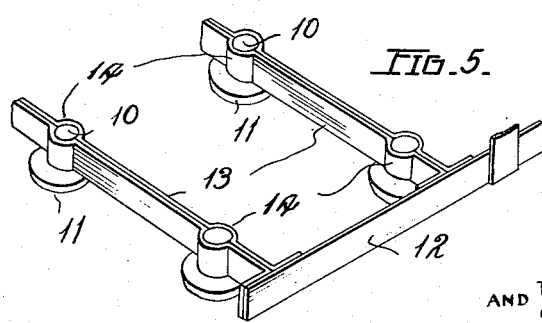
Figure 5 is a perspective view of ejectors and a part of the frame to which they are attached.

To enable all the ejectors to be operated simultaneously, they are carried on a floating inner frame comprising the end bars 12 and the transverse, composite bars 13. The construction of the composite bars is shown in Figure 5 wherein it will be seen that each bar comprises two similar bars spot welded to one another and to the end bars 12. The composite bars are bent away from one another at the appropriate points, to provide housings 14 for the reception of the studs 10 of the ejectors.

The bars 12 are connected to the perimeter 6 by the systems of levers or parallel linkage which are indicated compendiously by the reference 15, and connected thereto in pivotal manner there is a common operating bar or handle 16 which is in the form of a yoke.

Bars 17 and 18 are fixedly secured to opposite sides of the perimeter 6 and extend convergently upwardly, the said bars coming together some distance above the perimeter, where they are joined together, one of them being extended to form the loop or hook 19.

In use the device is placed over a filler containing eggs, and, when properly aligned therewith, pressed down over the eggs so that the said pairs of gripping members each pass over and grip an egg. The device is then lifted away from the fillers and carries with it all the eggs in the filler, at the one time, and, still retain in the device the eggs are subjected to any required treatment.

When it is desired to replace the eggs in the filler, the device, with the eggs therein, is again aligned over the filler, and, when properly positioned, the yoke handle is pulled upwardly, forcing the ejectors downwardly, and ejecting the eggs from the grippers back into the compartments of the filler.

Return springs 20 are secured between the perimeter and the floating frame so that when the yoke handle is released, the ejectors are returned to their original settings at the tops of their respective gripping members.

With certain types of fillers, it has been found that the filler occasionally displays a tendency to cling to the eggs and be lifted therewith, and the construction may therefore include a pusher adapted to be operated as the eggs are lifted, for the purpose of pushing the filler away.

Many arrangements will suggest themselves, and, in one construction, the pusher may comprise a vertically arranged rod having a footpiece at its lower end adapted to contact the filler, and a knob or finger piece at the upper end, whereby the rod may be forced downwardly at the appropriate time, and, if desired, the said rod may be loaded with a return spring.

We claim:

1. In a device for handling eggs, a pair of cooperating horizontal rectangular frames, each having a plurality of equally spaced transverse bars, said frames being disposed in telescoping relationship with respect to one another, a plurality of equally spaced egg-gripping members carried on the transverse bars of a first one of said frames, a corresponding number of egg-ejecting members carried on the transverse bars of the second of said frames, one of said egg-ejecting members being associated with each egg-gripping member and being disposed above an egg held by the egg-gripping member, parallel linkage operatively connecting the two frames for effecting movement of said frames vertically relative to one another while maintaining the frames approximately parallel, and means for moving said second frame downwardly relatively to the first to eject eggs held by the egg-gripping members, said last-named means comprising a lever arm pivotally connected to the said second frame and positioned for movement by the hand of the person supporting the device, a pair of links pivotally connected to said first frame, one of said pair of links being connected to said lever, a connecting bar connecting said links and an arm connecting the other of said pair of links to said second frame.

2. In a device for handling eggs, a first horizontal rectangular frame having a plurality of equally spaced transverse bars, a plurality of equally-spaced egg gripping units carried by said transverse bars, each of said units comprising spaced resilient gripping elements, a second horizontal rectangular frame disposed in telescoping relationship with respect to the first frame and having a plurality of equally spaced transverse bars disposed below the transverse bars of the first frame and passing between the spaced gripping elements of the second gripping units, a plurality of egg ejecting members carried by the bars of said second frame, an egg ejecting means being disposed between the gripping elements of each egg gripping unit and being adapted to be positioned above the egg held by the egg gripping unit, a parallel linkage connected to said frames for effecting movement of said frames vertically relative to one another while maintaining the frames parallel and in telescoping relationship, and a lever arm positioned for movement by the hand of the person supporting the device, said lever arm being pivotally connected to one of said frames and to said parallel linkage for moving said second frame downwardly relatively to the first frame to eject eggs held by the egg gripping units.

3. A device according to claim 2, in which the transverse bars of the second frame extend crosswise of the transverse bars of the first frame.

4. In a device for handling eggs, a first horizontal rectangular frame having a plurality of equally spaced transverse bars, a plurality of equally-spaced egg gripping units carried by said transverse bars, each of said units comprising a pair of spaced loops of spring wire extending downwardly from the bar on which said egg-gripping unit is mounted and having a reentrant portion to form an inner loop and a pair of outer arms between which the inner loop is disposed, a second horizontal rectangular frame disposed in telescoping relationship with respect to the first frame and having a plurality of equally-spaced transverse bars disposed below the transverse bars of the first frame and passing between the spaced gripping elements of the second gripping units, a plurality of egg ejecting members carried by the bars of said second frame, an egg ejecting means being disposed between the gripping elements of each egg gripping unit and being adapted to be positioned above an egg held by the egg gripping unit, a parallel linkage connected to said frames for effecting movement of said frames vertically relative to one another while maintaining the frames parallel and in telescoping relationship, and a lever arm positioned for movement by the hand of the person supporting the device and pivotally connected to said second frame, said parallel linkage comprising a pair of links pivotally connected to said first frame, one of said pair of links being connected to said lever, a connecting bar connecting said links, and an arm connecting the other of said pair of links to said second frame.

ROY S. WHITCHER.
GEORGE O. WYATT.

References Cited in the file of this patent

UNITED STATES PATENTS

| Number | Name | Date |
|---|---|---|
| 879,801 | Swanson | Feb. 18, 1908 |
| 1,220,439 | McLellan et al. | Mar. 27, 1917 |
| 1,500,939 | Howell | July 8, 1924 |
| 1,573,332 | Smythe et al. | Feb. 16, 1926 |
| 2,334,654 | Sportolari | Nov. 16, 1943 |

FOREIGN PATENTS

| Number | Country | Date |
|---|---|---|
| 172,200 | Switzerland | Dec. 17, 1934 |